C. DE LUKACSEVICS.
INTERNAL COMBUSTION ENGINE.
APPLICATION FILED MAY 22, 1919.
1,377,897.
Patented May 10, 1921.
8 SHEETS—SHEET 8.
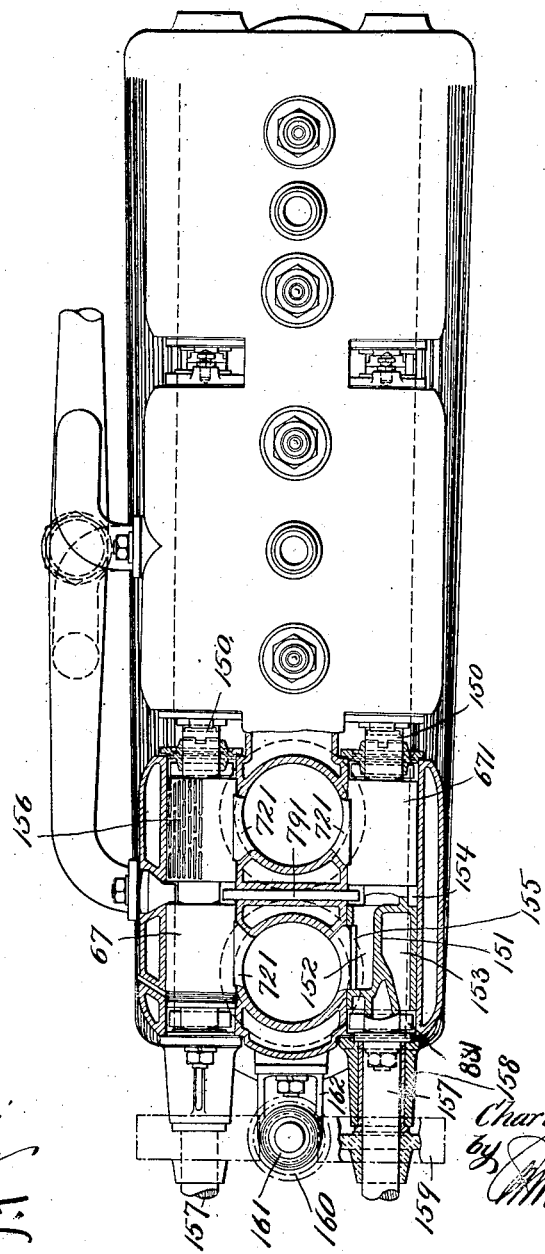

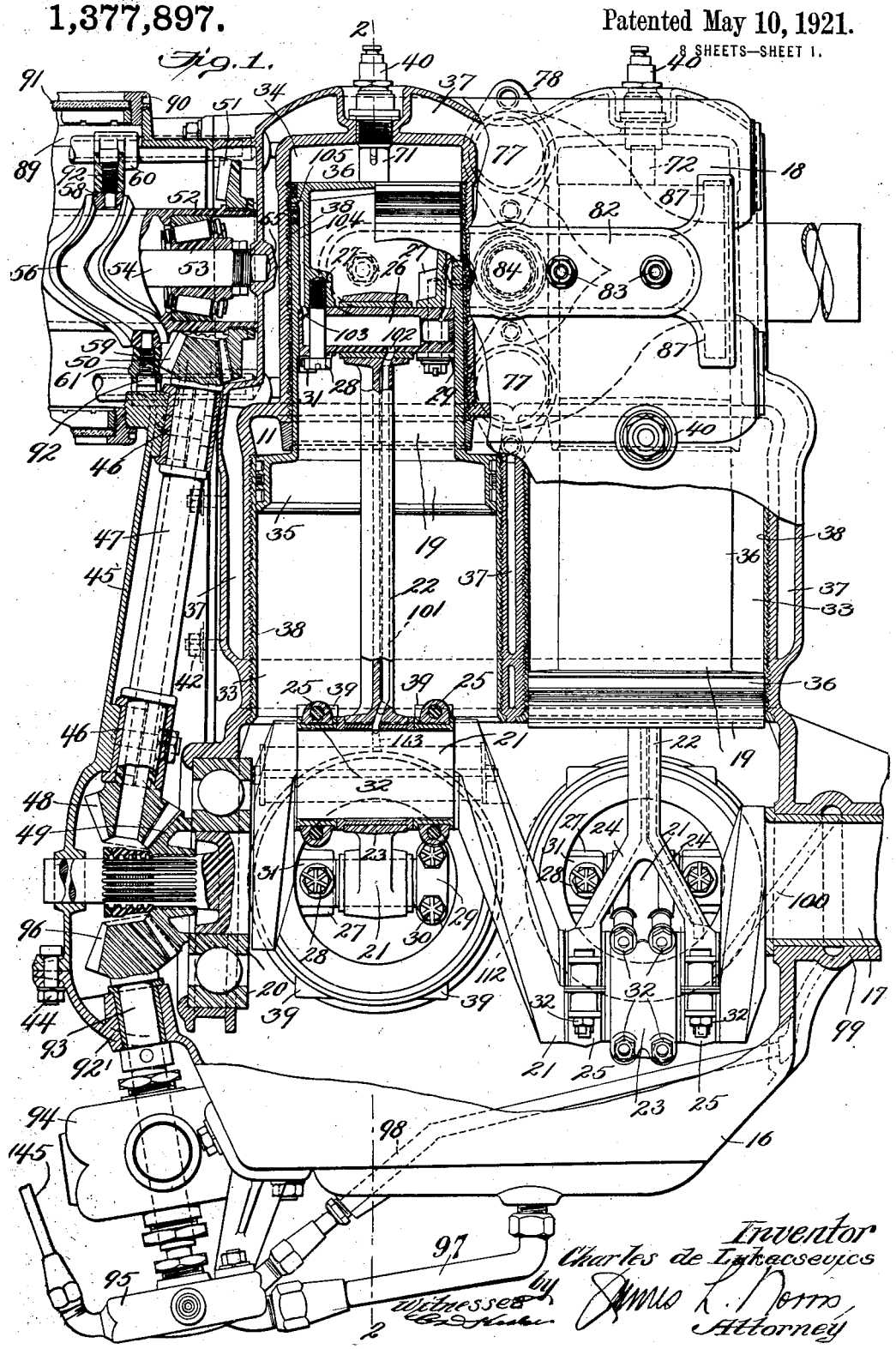

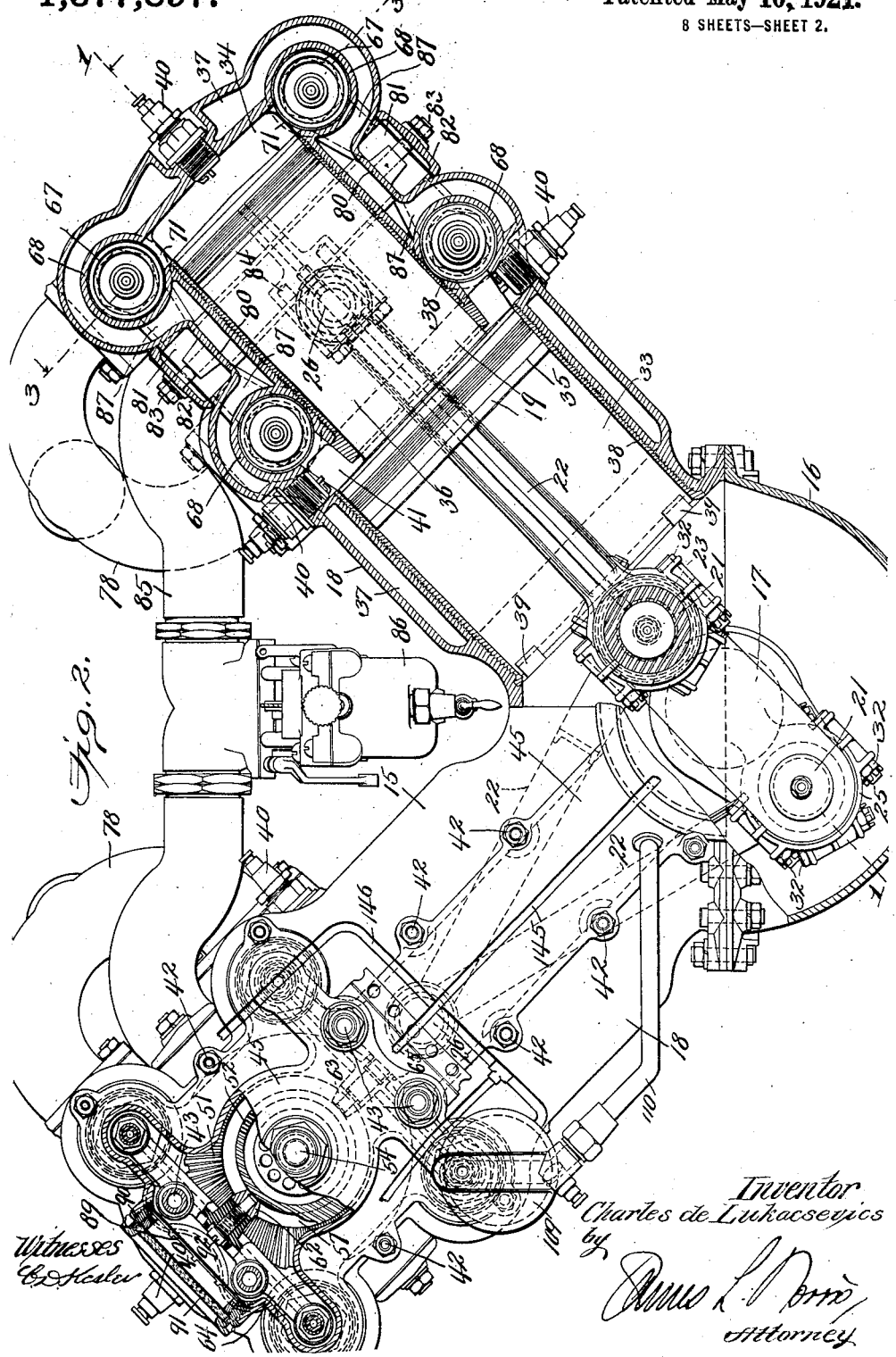

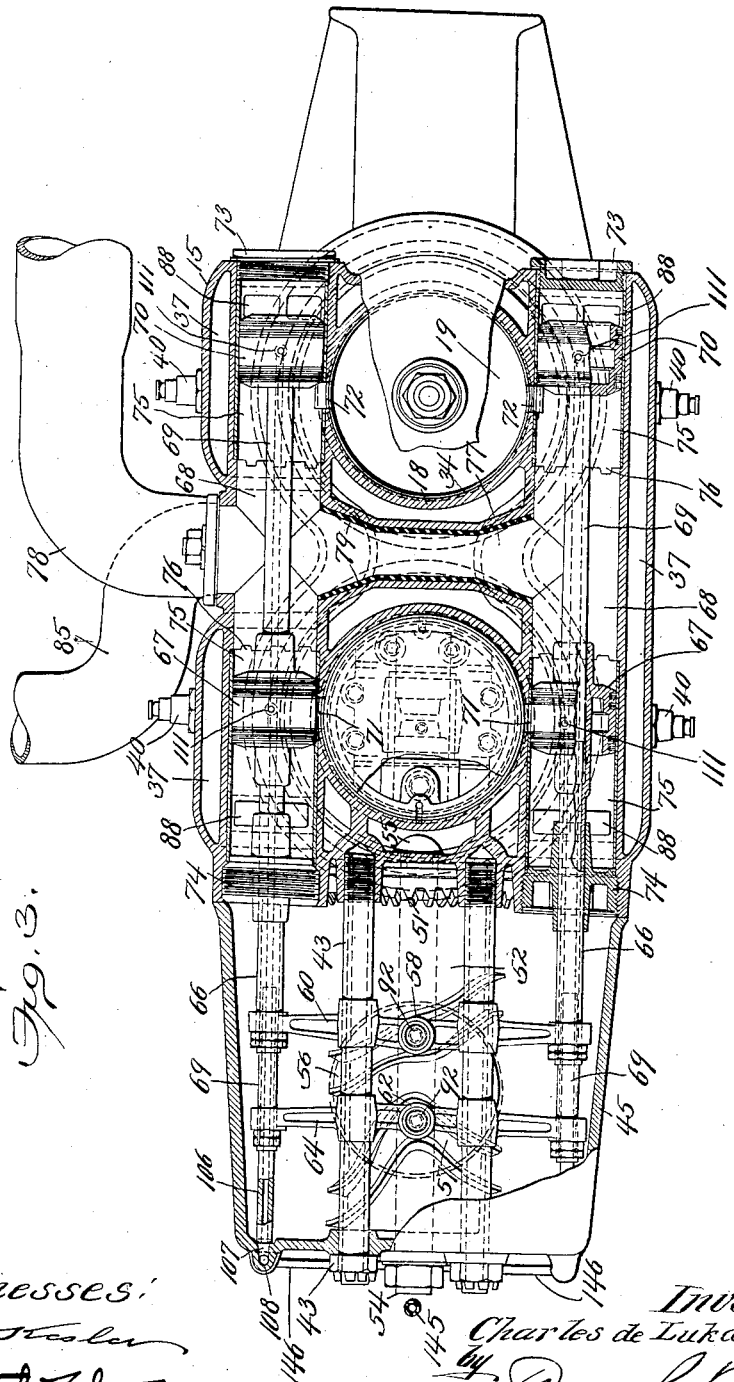

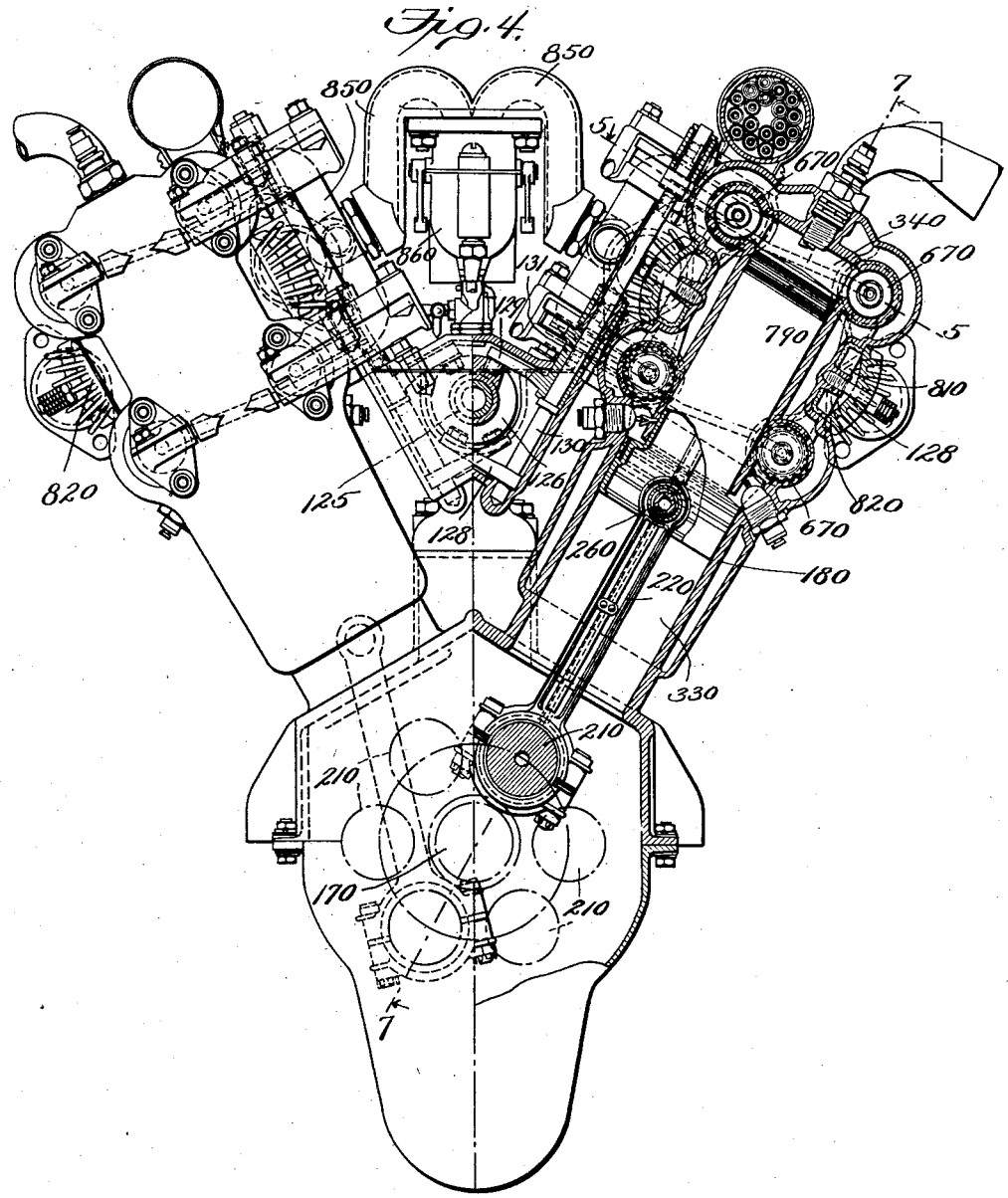

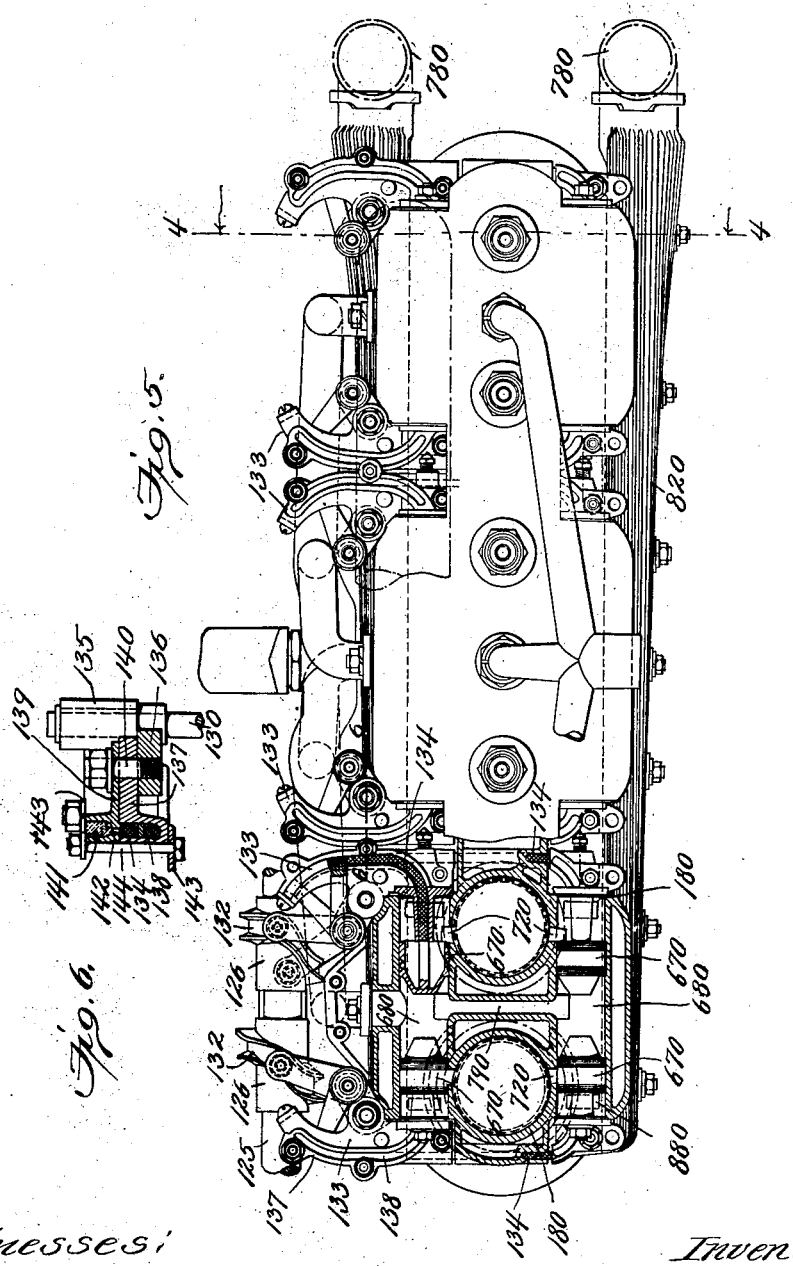

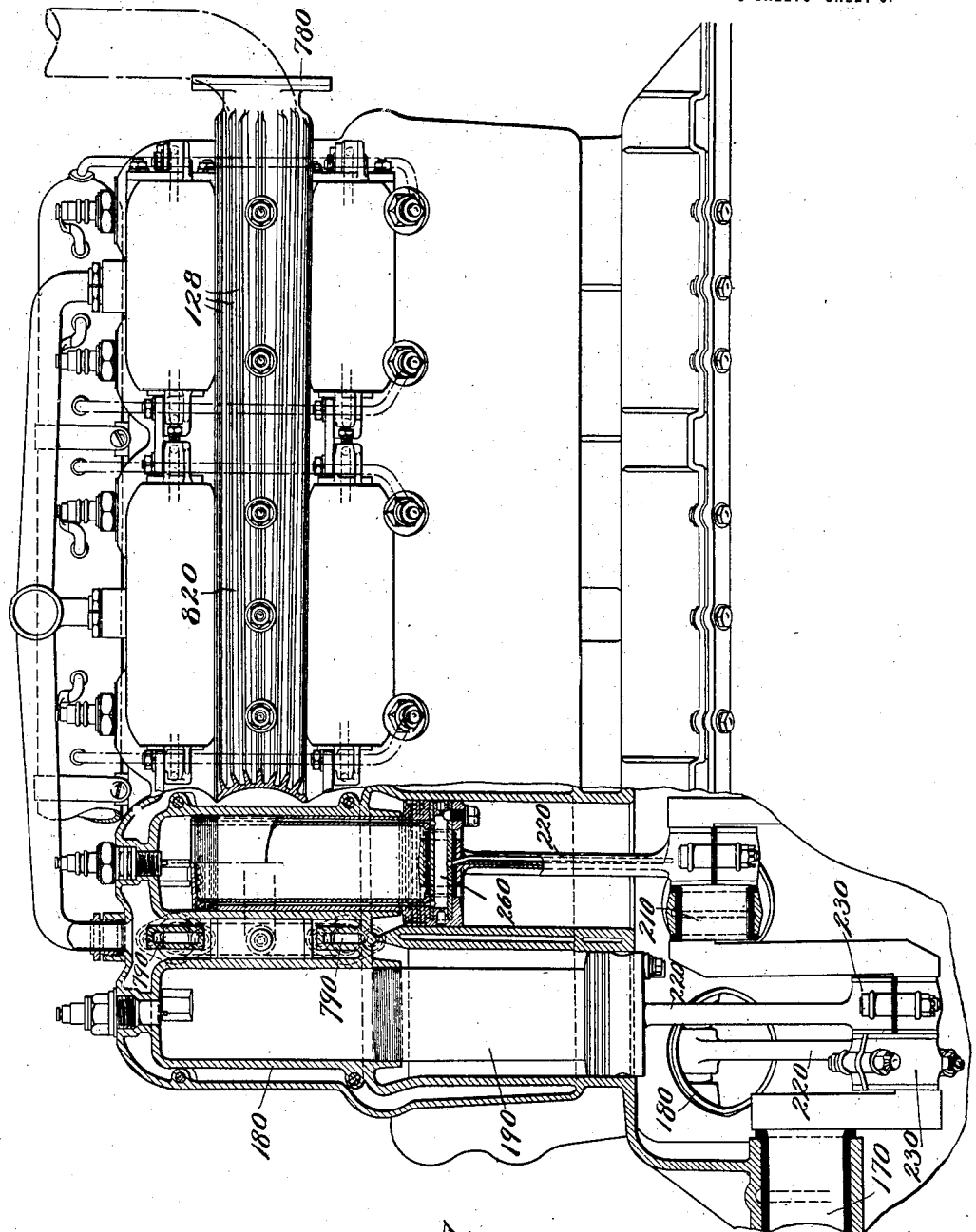

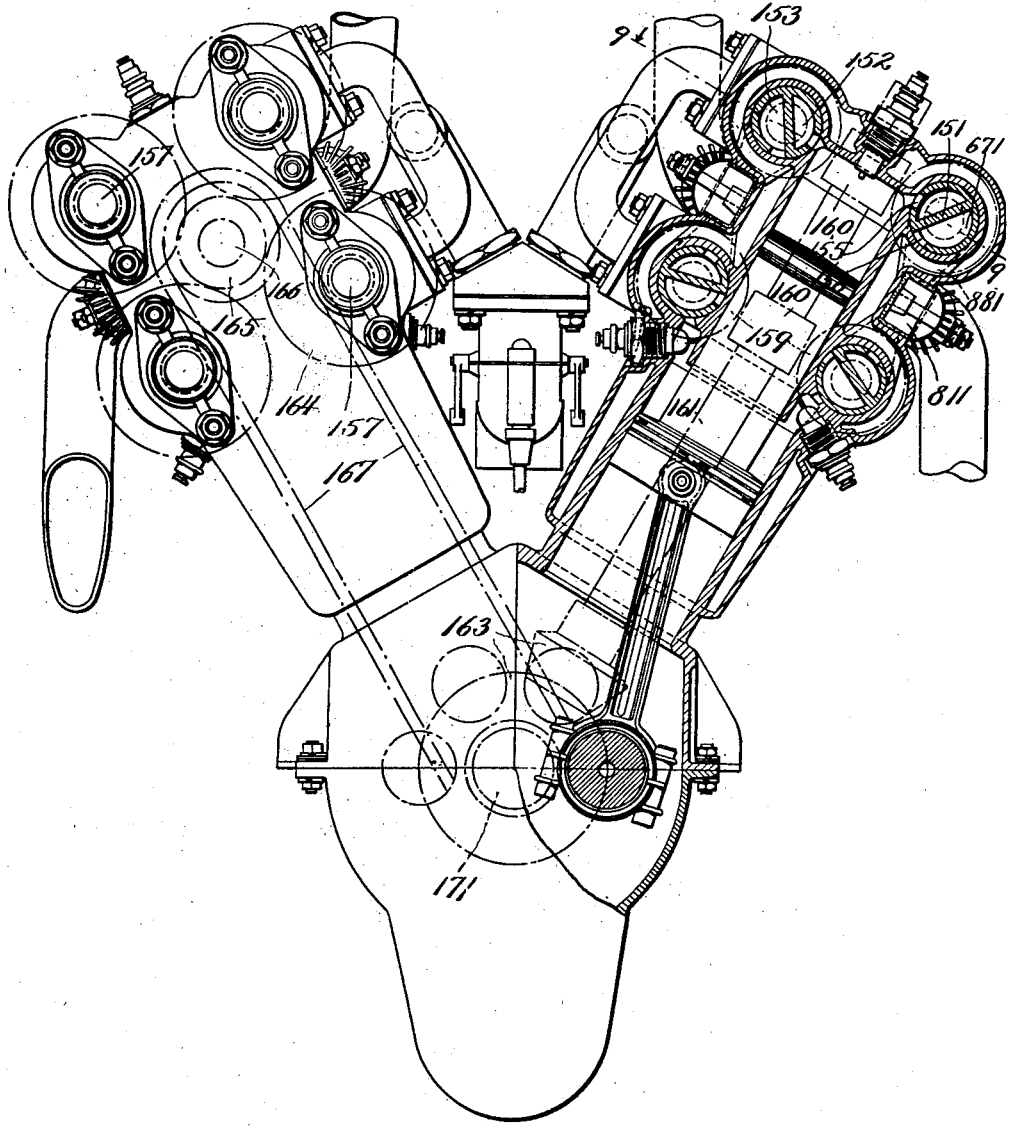

UNITED STATES PATENT OFFICE.

CHARLES DE LUKACSEVICS, OF NEW YORK, N. Y.

INTERNAL-COMBUSTION ENGINE.

1,377,897. Specification of Letters Patent. Patented May 10, 1921.

Application filed May 22, 1919. Serial No. 298,837.

*To all whom it may concern:*

Be it known that I, CHARLES DE LUKACSEVICS, a citizen of the United States, residing at New York, in the county of New York and State of New York, have invented new and useful Improvements in Internal-Combustion Engines, of which the following is a specification.

This invention relates to internal combustion engines and especially, although not necessarily exclusively as to all of its features, to engines of the radial cylinder or V-type, of which one unit comprises two cylinders arranged with their axes at an angle to one another and perpendicular to the crank shaft. An engine of this type may, and in the present instance does, comprise a plurality of units constituting two angularly disposed sets of cylinders, the axes of the cylinders of each set lying in a plane passing through the axis of the crank shaft and disposed at an angle to the plane of the axes of the cylinders of the other set.

The invention has for its objects to provide an engine of this type of very light and compact construction especially suitable for aeronautical purposes; to increase the number of cylinders without materially increasing the weight or size of the engine, the length of the crank shaft, or the number of connecting rods, wrist pins, etc.; to improve the piston design in such a manner as to eliminate wrist pin troubles and provide more efficient bearing facilities; to reduce to a minimum the objectionable effects of the inertia forces of the reciprocating parts; to provide an improved valve mechanism of such a character as to present a large cylinder port area, permitting a quick in-take and a rapid exhaust; to provide a valve mechanism which can be assembled and attached to or removed from the engine as a unit and in which inspection and the making of quick repairs is facilitated; and to provide improved lubricating means for various parts of the engine and valve mechanism.

The foregoing and other objects of the invention, together with means whereby the same may be carried into effect, will best be understood from the following description of certain forms or embodiments thereof illustrated in the accompanying drawings. It will be understood, however, that the particular constructions and arrangements described and shown have been chosen for illustrative purposes merely, and that the invention, as defined by the claims hereunto appended, may be otherwise embodied without departing from the spirit and scope thereof.

In said drawings:—

Figure 1 is a section, substantially on the line 1—1, Fig. 2, through one of the sets of cylinders, a portion of one of said cylinders being shown in elevation.

Fig. 2 is an end elevation, partly broken away and partly in section on the line 2—2, Fig. 1.

Fig. 3 is a section on the line 3—3, Fig. 2.

Fig. 4 is a view similar to Fig. 2, showing a modified construction.

Fig. 5 is a plan view, partly in section on the line 5—5, Fig. 4, of one of the sets of cylinders shown in the latter figure.

Fig. 6 is a detail section on the line 6—6, Fig. 5.

Fig. 7 is a side elevation, partly in section, on the line 7—7, Fig. 4, of the set of cylinders shown in Fig. 5.

Figs. 8 and 9 are views similar to Figs 4 and 5, respectively, of a further modification.

Referring to Figs. 1 to 3, the engine body or casing comprises a main portion or section 15 and a cover 16 which, together with the open lower end of the section 15, constitutes a combined oil sump and crank case for the crank shaft 17. The main section 15 comprises (preferably in one integral unit) two pairs or sets of double cylinders 18, the axes of the cylinders of each set lying in a plane containing the axis of the crank shaft, and the planes of the two sets intersecting one another in the axis of said crank shaft at an angle of approximately 90°. Each cylinder of each set is disposed opposite a cylinder of the other set, and the axes of corresponding cylinders of the two sets lie in a plane perpendicular to the axis of the crank shaft. Mounted to reciprocate in each of the cylinders 18 is a double piston 19 hereinafter more fully described. The crank shaft 17 is journaled at one end in a suitable bearing 99 formed at the meeting edges of the casing members 15 and 16 and at the opposite end in an anti-friction bearing 20 supported by the casing member 15. Said crank shaft 17 is formed with a number of cranks 21 corresponding to the number of cylinders in each set, said cranks being angularly spaced at equal intervals about the axis of said shaft. As herein shown, each set comprises two double cylinders 18, and the crank shaft 17 is accordingly provided with two cranks 21 spaced 180° apart. Each of the cranks 21 is connected by a connecting rod 22 with two pistons 19 of the corresponding cylinder of the two sets. In order thus to permit the connection of two piston rods in substantially the same plane with the same crank, one of said piston rods of each set is provided with an eye or strap 23 rotatably embracing the central portion of the corresponding crank pin, while the other piston rod is bifurcated at one end, the two branches 24 carrying a pair of straps 25 rotatably mounted on said crank pin at opposite sides of the strap 23. The straps 23 and 25 are, as usual, split and held in assembled position about the crank pins by means of the usual bolts 32. At their outer ends the rods 22 rotatably engage hollow wrist pins 26 carried by the double pistons 19, said pistons being provided with lugs 27 to which said wrist pins are secured, either directly by means of bolts 28 passing through said wrist pins, as shown at the left in Fig. 1, or by means of straps 29 engaging said wrist pins and secured to said lugs by bolts 30, as shown at the right in said figure. In the former case, the wrist pins 26 are preferably flattened at their inner sides, as at 31, to afford a firm seat for the heads of the bolts 28.

Each of the cylinders 18 comprises inner and outer portions 33 and 34 of different diameters, the diameter of the inner cylinder portion 33 being greater than that of the outer cylinder portion 34. The pistons 19 are similarly formed of two diameters comprising an inner piston portion 35 fitting the cylinder portion 33 and an outer piston portion 36 fitting the outer cylinder portion 34. By this construction it will be seen that each complete cylinder 18 constitutes, in effect, a group of two tandem cylinders each having its own piston, said pistons being formed integral with one another. The explosion space of each of the cylinders or cylinder portions 33 and 34 is provided with suitable ignition means, such as the usual spark plug 40. In order to insure quick and complete combustion in the annular combustion spaces 41 of the inner cylinder portions 33, said inner cylinder portions are preferably each provided with two diametrically oppositely disposed spark plugs 40.

It will thus be seen that the construction shown, comprising two angularly disposed pairs of double cylinders, constitutes, in effect, an eight-cylinder engine employing, however, but four pistons and four piston or connecting rods, and requiring only two cranks on the crank shaft. Moreover, by reason of the fact that the larger cylinder portions 33 are adjacent the crank case, so that the openings of said cylinders to said crank case are relatively large in proportion to the swing of the cranks 21, said cylinders may be set with their inner ends relatively close to the crank shaft, permitting the use of relatively short piston rods 22 and providing an extremely compact construction. In this manner there is provided an eight-cylinder engine whose weight and over-all dimensions are slightly, if any, greater than those of the usual four-cylinder engine of the same type, while the crank shaft may be made as short as that usually required for a two-cylinder engine only, eliminating, to a large extent, deflection problems, and permitting said shaft to be securely supported in two bearings set relatively close together and not likely to be thrown out of alinement.

The engine body is preferably composed of cast aluminum, the section 18 being formed with double walls to provide a suitable water jacket 37 for the cylinders and valve chambers hereinafter described. The aluminum cylinder portions 33 and 34 are preferably lined by steel sleeves 38 in threaded engagement with the inner walls of said cylinder portions. The edges of the inner ends of the cylinder portions 33 are preferably notched, as shown at 39, in order to insure suitable clearance for the crank pin strap bolts 32, and the edges of the corresponding sleeves 38 are slotted and forced into said notches, thereby holding said sleeves against turning.

Secured to the end of the main body section 15 by cap screws 42 and bolts 43, and to the cover 16 by bolts 44, is an auxiliary V-shaped casing 45 by which the valve operating mechanism is carried and housed. Journaled in suitable bearings 46 in the angularly disposed branches of the casing 45 are two shafts 47 disposed longitudinally of said branches and each having at its inner end a bevel pinion 48 meshing with a bevel gear 49 fast on the crank shaft 17. Each of the shafts 47 operates valve mechanism for one of the sets or pairs of cylinders 18, and, as the valve mechanisms of the two sets are precisely similar, a description of one will suffice for both.

The shaft 47 carries at its upper end a bevel pinion 50 which meshes with a bevel gear 51 fast on a cam drum 52 rotatably mounted by means of anti-friction bearings 53 on a stud shaft 54 carried by the auxiliary casing 45 and seated at its inner end in a suitably disposed socket 55 formed in the body member 15, as shown in Fig. 1. The gears 48, 49, 50 and 51 are so relatively proportioned that the drum 52 is driven at one half the speed of the crank shaft 17. The cam drum 52 is formed with two cam paths or grooves 56 and 57. Coöperating with the cam groove 56 are two cam rollers 58 and 59 (see Figs. 1 and 3) carried, respectively, by upper and lower cross heads 60 and 61 slidably mounted on the bolts 43. Similarly coöperating with the cam groove 57 are two cam rollers 62 and 63 (see Figs. 2 and 3) carried, respectively, by upper and lower cross heads 64 and 65 also slidably mounted on the bolts 43. The cross heads 61 and 65 and the mechanism operated thereby are precisely similar to the cross heads 60 and 64 and the mechanism operated by the latter, so that a description of one of these sets of devices will be sufficient for both.

Secured to the opposite ends of the cross head 60 are two parallel hollow valve rods 66 carrying at their inner ends piston valves 67 arranged to reciprocate in cylindrical valve chambers 68. Said chambers 68 are formed in the casing or body member 15 adjacent the outer ends of the cylinders 18 at opposite sides of the latter, the axes of said valve chambers being substantially at right angles to the axes of said cylinders and lying in planes parallel thereto. Similarly secured to the opposite ends of the cross head 64 are two valve rods 69 arranged co-axially with the valve rods 66 and extending through or telescoping with the same, said valve rods 69 carrying at their opposite ends piston valve 70 similar to the piston valves 67 and also arranged to reciprocate in the cylindrical valve chambers 68.

The valves 67 control ports 71 communicating with one of the cylinders 18 of the corresponding pair at opposite sides of the latter, while the valve 70 control similar ports 72 communicating with the other cylinder 18 of said pair. The upper or outer valves 67 and 70, operated by the cross heads 60 and 64, control the outer cylinder portions 34, while the lower or inner similar valves, operated by the cross heads 61 and 65, in a similar manner control the inner cylinder portions 33, as will be clear from the drawings, particularly Fig. 2, without further description in detail.

The cylindrical valve chambers 68 are closed at their opposite ends by screw plugs or caps 73 and 74. The valve rods 66 pass through and are guided in suitably formed sleeve portions of the caps 74, while the valve rods 69, which are also formed hollow for purposes hereinafter explained, pass axially through and are guided in the hollow valve rods 66. The portions of the valve chambers 68 within which the valves 67 and 70 operate are provided with steel liners or sleeves 75 having notched ends 76 which engage correspondingly formed projections on the inner walls of said chambers to prevent said sleeevs or liners from turning.

As will be clear from the foregoing, the valve chambers 68 are disposed in inner and outer pairs. The two chambers of each pair are connected by an exhaust channel or passage 77 extending between the engine cylinders, and one of the valve chambers 68 of each pair is connected with an exhaust manifold 78. The exhaust channel 77 is preferably provided with a lining 79 of refractory material, such as mica cement. Between the two valve chambers 68 at each side of the cylinders 18 the engine casing is formed with a depression 80 (Fig. 2) constituting an inlet chamber 81 closed by a cap 82 removably secured to the casing by bolts 83, the removal of said caps permitting ready access to said inlet chambers for cleaning purposes. The inlet chambers 81 are connected by an inlet passage 84 extending between the two engine cylinders and between the upper and lower exhaust passages 79, while one of said inlet chambers 81 communicate with the intake manifold 85 leading from the usual carbureter 86. Leading from each end of each of the inlet chambers 81 are two passages 87, said passages communicating, respectively, with inlet ports 88 in the several sleeves 75 adjacent the outer ends of the valve chambers 68.

As will now be seen, rotation of the cam drum 52 will cause the valves 67 and 70 to be reciprocated in the chambers 68 in such a manner as to close the ports 71 or 72 during the compression and explosion strokes of the engine, or to place said ports in communication with either the inlet or the exhaust. By reason of the fact that two valves are employed to control two diametrically opposite ports in each cylinder, it will be seen that the port area is relatively large, thereby providing for the rapid inlet or exhaust of a considerable volume of gas. It will, of course, be understood that the cam grooves 56 and 57 will be so designed as to produce such relative movements of the several valves as is required in accordance with the desired firing order of the several cylinders. This firing order will preferably be such that a cylinder 33 of one set is fired simultaneously with a cylinder 34 of the other set, an explosion in two cylinders thus taking place at each 90° movement of the crank shaft. As shown in Fig. 1, the crank shaft 17 is extended beyond the gear 49 and projects through the casing to provide a connection for any suitable ignition timer. The ignition system is not shown since it constitutes no portion of the present invention and may be of any well known type.

It will be seen that the entire valve operating mechanism with the exception of the valve rods and cross heads is carried entirely by the auxiliary casing 45 and may be assembled therein and removed therewith for purposes of inspection and repair by the removal of the screws 42 and the nuts from the bolts 43, and also by removing the cam rollers to permit the cam drum to be taken out while leaving the cross heads supported on the bolts 43. In order to facilitate the removal of the cam rollers for this purpose, as also for purposes of repair or renewal of said rollers, the auxiliary casing 45 is formed with hand holes 89 normally closed by plugs or covers 90 preferably provided with glass observation panels 91. The cam rollers are loosely carried by screw studs 92 in threaded engagement with the cross heads and readily removable therefrom through the hand holes 89.

Journaled in a suitable bearing 92' in the gear casing cover portion of the body member 16 is a shaft 93 for operating suitable water and oil pumps 94 and 95, respectively, said shaft being rotated by means of a pinion 96 on its upper end which meshes with the gear 49 on the crank shaft. The water pump 94 may be arranged to circulate water or other suitable cooling fluid through the water jacket 37 and through a suitable radiator. The specific cooling system, however, forms no portion of the present invention and the connections are, therefore, not illustrated in detail.

The oil pump 95 is adapted to draw lubricant through a pipe 97 from the oil sump in the crank case cover 16 and to force the same through pipes 98 and 145. The pipe 98 leads to the bearing 99 of the hollow crank shaft 17 within which the lubricant passes through a channel 100 to the hollow crank pins 21 (which are connected by a passage 112 in the crank), thence through ports 113 in said crank pins to the exterior thereof, thence, through tubes 101 carried by the piston rods and ports 102 in the wrist pin straps, to the hollow wrist pins 26, thence through ports 103 in the latter to passages 104 in the piston portions 36, and finally through ports 105 in said piston portions to the walls of the cylinder portions 35 from which the lubricant gravitates to the walls of the cylinder portions 33, and thence returns to the oil sump.

The pipe 145 leads to the top of the valve casing 45 and discharges oil upon the cam drum 52, the excess oil gravitating to and being accumulated in a reservoir 109 having an overflow pipe 110 leading to the crank case, whereby said oil is returned to the oil sump.

The outer ends of the hollow valve rods 69 are slidably mounted on hollow studs 106 which project inwardly from the outer end of the auxiliary casing 45 and extend into the ends of said valve rods. The interiors of the studs 106 communicate through passages 107 controlled by check valves 108 with pipes 146 leading from the oil reservoir 109. By reason of the check valves 108, the reciprocating movement of the valve rods 69 on the studs 106 causes oil to be pumped through said valve rods and also through the valve rods 66. The valves 67 and 70 are provided with ports 111 communicating with the hollow interiors of the valve rods, whereby the lubricant in the latter may pass outwardly through said ports to lubricate the walls of the valve chambers.

As in the construction above described, the engine shown in Figs. 4 to 7 comprises two sets of double cylinders, but in the latter construction each set comprises six double cylinders, preferably arranged in pairs as in the construction shown in Figs. 1 to 3, thereby constituting, in effect, a twenty-four cylinder engine in which the several cranks 210 on the crank shaft 170 are spaced sixty degrees apart, the planes of the axes of the cylinders 180 of the two sets being correspondingly disposed at an angle of sixty degrees.

In this construction the connection of the several pistons 190 may, if desired, be as illustrated in Figs. 1 and 2, but as shown most clearly in Fig. 7, the corresponding double cylinders 180 of the two sets are slightly offset from one another to permit the piston rods 220 to be disposed side by side, each of said piston rods being connected with the appropriate crank pin 210 by a single strap 230. The wrist pins 260 to which the outer ends of the piston rods 220 are connected are carried by the piston members 190 adjacent their inner ends, thereby permitting the use of short piston rods and preventing the over-heating of said wrist pins.

Journaled in the engine body between the two sets of cylinders, and extending longitudinally thereof parallel to the main shaft 170, is a cam shaft 125 provided with cams 126 which, through connections hereinafter more fully described, operate piston valves 670 corresponding in arrangement and function to the piston valves 67 and 70 of the construction shown in Figs. 1 to 3. The cam shaft 125 is rotated at a suitable speed from the main shaft 170 by means of any suitable power transmitting connection, such, for example, as a sprocket chain. Such connections being well known in the art, are not illustrated herein.

As in the construction first described, the piston valves 670 reciprocate in cylindrical valve chambers 680, which communicate with one another through transverse passages 790, and control ports 720 communicating with the cylinders 180. In this construction, however, the positions of the intake and exhaust chambers and passages are reversed, the intake manifold 850 from the carbureter 860 communicating with the valve chambers 680 at their central portions, and the chambers 810, which communicate with the ends of the valve chambers 680 through ports 880, constituting exhaust chambers which connect at their ends 770 with a suitable exhaust manifold or header, not shown. Accordingly, the chambers 810 are preferably provided with linings 780 of refractory material, while the caps or covers 820 of said chambers are preferably formed with heat radiating ribs or flanges 128.

As in the construction first described, the valve mechanisms of the two sets of cylinders are alike, so that a description of one will be sufficient. The cams 126 correspond in number to the double engine cylinders of each set, and each is arranged to operate a pair of co-axial rock shafts 130 and 131 (Fig. 4) journaled in the engine body or casing and disposed parallel to the engine cylinders, said rock shafts being provided with arms 128 and 129 carrying cam rollers which coöperate with cam grooves 132 in said cams. Each of the rock shafts 131 is formed hollow, and the corresponding rock shaft 130 passes therethrough and is journaled therein. The rock shafts 130 and 131 carry at their outer ends rockers 133, which, through suitable connections, operate the valves 670. The rocker 133 on each shaft 130 operates the two valves 670 which control the outer cylinder portion 340 of the corresponding cylinder, while the rocker 133 on each shaft 131 operates the two valves 670 which control the inner cylinder portion 330 of said cylinder. To this end each of the rockers 133 is connected to two valves 670 at opposite sides of the adjacent cylinder by means of flexible connecting members 134, such as wires or wire cords. Each rocker 133 comprises (see Fig. 6) a hub portion 135 secured to the corresponding rock shaft and having an arm 136 carrying a segmental member 137 provided with a groove 138 to receive the ends of the corresponding connecting members 134 which are retained in said groove by a cap member 139 secured to the segmental member by a bolt or screw 140, the latter serving also to secure said segmental member to the arm 136. The cap member 139 is provided with a recess to receive a lubricant pad 141 adapted to feed lubricant through an opening 142 to the connecting members 134. The members 137 and 139 are further secured together, and the lubricant pad 141 retained in its recess, by plates 143 connected by clamping bolts 144.

The general organization of the engine shown in Figs. 8 and 9, and the arrangement of the valve chambers and the inlet and exhaust passages, are all substantially the same as in the construction shown in Figs. 4 to 7. In this construction, however, rotary valves 671 instead of piston valves are employed, said valves being arranged in groups of four each, the valves of each group being alined with the corresponding valves of the adjacent group or groups in the same set of cylinders, and being connected therewith by universal joints 150. One of said groups of valves is provided for each pair of double cylinders of a set, and each valve of each group controls the corresponding cylinder portions of the two cylinders of the pair. The valves 671 are formed hollow, and each is divided adjacent each end by a diametrically extending partition 151 into an inlet chamber 152 and an exhaust chamber 153. The exhaust chambers 153 extend to the ends of the valve, where they communicate with the exhaust passages 881 leading to the exhaust chamber 811. The inlet chambers 152 communicate at their inner ends with a central groove 154 in communication with the transverse inlet chambers or passages 791. Said inlet and exhaust chambers 152 and 153 are provided with peripheral ports 155 and 156, respectively, adapted, as a valve is rotated, to be brought successively into communication with the cylinder ports 721.

Preferably the peripheries of the valve 671 are provided with grooves, as indicated at 156′ in Fig. 9, to assist in forming a gastight joint with the walls of the valve chambers in which said valves are rotatably mounted.

By reason of the flexible or universal joints 150 connecting the several groups of valves for each set of cylinders, it will be clear that, by properly rotating the valves of the innermost groups, all of the valves of the other groups will be rotated in unison therewith, said flexible joints compensating for any variations in alinement, thereby obviating the necessity of careful workmanship in machining and assembling the parts.

The mechanism for rotating the valves 671 is capable of considerable variation. Thus, as shown in Fig. 9, and as indicated at the right in Fig. 8, the end-most valves of each set of cylinders may be formed with co-axial shaft portions 157 mounted in thrust bearings 158 carried by the engine body or casing, said shaft portions 157 carrying worm gears 159 coöperating with worms 160 on a shaft 161 disposed parallel with the cylinders and mounted to rotate in suitable bearings secured to the end of the body or casing, said shaft being operatively connected through bevel gears 163 with the main shaft 171.

As indicated at the left in Fig. 8, the valve shafts 157 may be provided with spur gears 164 meshing with a spur pinion 165 on a shaft 166 connected by chain and sprocket gearing 167 with the main shaft 171.

I claim:—

1. In an internal combustion engine, the combination with a plurality of double cylinders, each comprising inner and outer cylinder portions of different diameters disposed with their axes in a common plane, each of said cylinder portions having a plurality of combined inlet and exhaust ports, of a plurality of alined valves for controlling said ports respectively, the common axes of said valves being parallel to the plane of the axes of said cylinders, and a common means for reciprocating all of said valves transversely to the axes of the cylinders.

2. In an internal combustion engine, the combination with a plurality of cylinders disposed with their axes in a common plane, of a plurality of alined valves for controlling said cylinders respectively, the common axis of said valves being parallel to the plane of the axes of said cylinders, co-axial, telescoping valve rods for operating said valves respectively, and means whereby the movements of said rods create a pumping action for lubricating said valves.

3. In an internal combustion engine, the combination with an engine body comprising a plurality of sets of cylinders of different diameters, of a plurality of alined valves for controlling cylinders of like diameter, the common axes of said valves being parallel to the plane of the axes of said cylinders, telescoping valve rods for operating said valves respectively, a casing removably secured to the engine body, a drum having a plurality of cam grooves for actuating said valve rods, and a rotatable shaft actuated by the crank shaft of the engine for rotating said drum, said drum and rotatable shaft being removable as a unit with the casing.

4. A multiple cylinder internal combustion engine comprising a plurality of units, each unit consisting of two double cylinders in V shaped relation each comprising inner and outer alined cylinder portions of different diameters, each of said cylinder portions having combined inlet and exhaust valves, a crank shaft mounted between the double cylinders, pistons in said cylinders, alined valves for controlling cylinders of like diameter arranged on the same side of the crank shaft and common means for reciprocating all of the valves on the same side of the crank shaft.

5. In an internal combustion engine, in combination, a double cylinder comprising inner and outer alined cylinder portions, each of said cylinder portions having a plurality of ports, a plurality of valves for controlling the several ports of said inner cylinder portion, a plurality of valves for controlling the several ports of said outer cylinder portion, and a cam for operating in unison the valves controlling all of the ports of each cylinder portion.

6. In an internal combustion engine, the combination, with a plurality of cylinders disposed with their axes in a common plane, each of said cylinders having a plurality of ports, of a plurality of parallel sets of alined valves controlling the ports of said cylinders respectively, the axes of the valves of the several sets being parallel to the plane of the axes of said cylinders, the several ports of each cylinder being separately controlled by valves in different sets, and a cam for operating in unison the valves controlling all of the ports of each cylinder.

7. In an internal combustion engine, in combination, a plurality of double cylinders each comprising inner and outer cylinder portions, and each of the cylinder portions of each of said cylinders having a plurality of ports, a plurality of sets of valves for controlling the several ports of the inner cylinder portions of the several cylinders, a plurality of sets of valves for controlling the several ports of the outer cylinder portions of the several cylinders, each of said sets comprising a valve coöperating with each of said cylinders, and the several ports of each cylinder portion being separately controlled by valves in different sets, and a cam for operating in unison the valves controlling all of the ports of each cylinder portion.

8. In an internal combustion engine, in combination, a plurality of double cylinders each comprising inner and outer alined cylinder portions, said cylinders being disposed with their axes in a common plane, and each of the cylinder portions of each of said cylinders having a plurality of ports, a plurality of sets of alined valves for controlling the several ports of the inner cylinder portions of the several cylinders, a plurality of sets of alined valves for controlling the several ports of the outer cylinder portions of the several cylinders, the axes of the valves of the several sets being parallel to the plane of the axes of said cylinders, each of said sets comprising a valve coöperating with each of said cylinders, and the several ports of each cylinder portion being separately controlled by valves in different sets, and a cam for operating in unison the valves controlling all of the ports of each cylinder portion.

9. In an internal combustion engine, the combination with an engine body comprising a plurality of double cylinders disposed with their axes in a common plane, said double cylinders comprising cylinders of different diameters, each cylinder having two diametrically opposite ports, and cylindrical valve chambers disposed, respectively, at opposite sides of said cylinders with their axes parallel to the plane of the axes of said cylinders, each of said valve chambers communicating with one of the ports of each of said cylinders, of a set of alined valves in each of said chambers for controlling said cylinder ports respectively and a cam for simultaneously operating the valves associated with the cylinders of like diameter.

10. In a internal combustion engine, the combination with an engine body comprising a cylinder having two diametrically opposite combined inlet and exhaust ports, and cylindrical valve chambers disposed transverse to said cylinder at opposite sides thereof, of valves in said chambers for controlling said ports respectively, a cross head, rods connecting said valves with said cross head, and a drum having a cam groove formed therein for actuating said cross head.

11. In an internal combustion engine, the combination with an engine body comprising a plurality of cylinders disposed with their axes in a common plane, each of said cylinders having two diametrically opposite ports, and cylindrical valve chambers disposed at opposite sides of said cylinders with their axes parallel to the plane of the axes of said cylinders, each of said valve chambers communicating with one of the ports of each of said cylinders, of valves in each of said chambers for controlling said cylinder ports respectively, co-axial telescoping valve rods for operating said valves, respectively, cross heads connected to the valve rods of the valves controlling the several cylinders, and a drum having a cam groove formed therein for actuating the several cross-heads.

12. In an internal combustion engine, the combination with an engine body comprising a pair of parallel cylinders each having two diametrically opposite ports, cylindrical valve chambers disposed transverse to said cylinders at opposite sides thereof and each communicating with one of the ports of each of said cylinders, and a passage connecting said valve chambers and extending between said cylinders, of valves in said chambers for controlling said ports, and means for operating in unison the valves controlling both of the ports of each cylinder.

13. In an internal combustion engine, the combination with two cylinders disposed with their axes at an angle to one another, and a valve for controlling each of said cylinders, of a casing having portions removably secured to said cylinders respectively, and mechanism in said casing and removable therewith for operating said valves, said mechanism including a drum having a cam groove and means engaging said groove, said means being removable independently of the casing.

14. In an internal combustion engine, the combination with an engine body comprising a cylinder, and a valve for controlling said cylinder, of a casing removably secured to said engine body, valve operating mechanism in said casing and removable therewith, said mechanism including a cam, a valve rod connected with said valve, and a roller operatively connected with said valve rod and coöperating with said cam, said casing having a hand hole through which said roller may be removed.

15. In an internal combustion engine, the combination with an engine body comprising a plurality of cylinders disposed with their axes in a common plane, and a plurality of alined valves for controlling said cylinders, respectively, the common axis of said valves being parallel to the plane of the axes of said cylinders, of a casing removably secured to said engine body, valve operating mechanism in said casing and removable therewith, said mechanism including a cam, coaxial telescoping valve rods for operating said valves, respectively, and rollers operatively connected with said valve rods and coöperating with said cam, said casing having a hand-hole through which said rollers may be removed.

16. In an internal combustion engine, the combination with an engine body comprising a cylinder, and a valve for controlling said cylinder, of a casing, means including a pair of bolts for removably securing said casing to said engine body, valve operating mechanism in said casing and removable therewith, said mechanism including a cam, and a cross head operated by said cam, guided on said bolts, and operatively connected with said valve.

17. In an internal combustion engine, the combination with an engine body comprising a cylinder having two diametrically opposite ports and cylindrical valve chambers disposed transverse to said cylinder at opposite sides thereof, of valves in said chambers for controlling said ports, respectively, a casing, means including a pair of bolts for removably securing said casing to said engine body, valve operating mechanism in said casing and removable therewith, said mechanism including a cam, a cross-head operated by said cam and guided on said bolts, and rods connecting said valves with said cross-head.

18. In an internal combustion engine, the combination with an engine body comprising a cylinder, and a valve for controlling said cylinder, of a casing, means including a pair of bolts for removably securing said casing to said engine body, valve operating mechanism in said casing and removable therewith, said mechanism including a cam, a valve rod connected with said valve, a cross-head to which said valve rod is connected, said cross-head being guided on said bolts, and a roller carried by said cross-head and coöperating with said cam, said casing having a hand-hole through which said roller may be removed.

19. In an internal combustion engine, in combination, a double cylinder comprising inner and outer alined cylinder portions of different diameters, double pistons in said cylinders, a valve casing having two valve chambers, an exterior depression between said valve chambers, and an exterior cover removably secured to said casing over said depression and inclosing a gas passage, and separate valves in said valve chambers for controlling said cylinder portions, respectively.

20. In an internal combustion engine, the combination with a cylinder and valve for controlling the same, said valve having an oil duct therein, a hollow valve rod connected to said valve and forming with said duct a continuous passage to the surface of said valve, means for reciprocating said rod, a hollow stud communicating with the interior of said rod and on which the rod is guided, an oil conduit communicating with said stud, and a check valve for controlling the flow of oil between said conduit and stud, whereby the reciprocating movements of said rod act in conjunction with said stud to force oil to the valve surface for lubricating purposes.

21. In an internal combustion engine, the combination with a plurality of cylinders disposed with their axes in a common plane, of a plurality of alined valves for controlling said cylinders, respectively, the common axis of said valves being parallel to the plane of the axes of said cylinders, co-axial telescoping hollow valve rods connected to said valves, respectively, means for reciprocating said rods, a hollow stud communicating with the interior of one of said rods on which said rod is guided, an oil conduit communicating with said stud, and a check valve for controlling the flow of oil between said conduit and stud.

In testimony whereof I have hereunto set my hand in presence of two subscribing witnesses.

CHARLES DE LUKACSEVICS.

Witnesses:
F. H. KNAPP,
JULIAN WITTAL.